US005915741A

United States Patent [19]

Parker

[11] Patent Number: 5,915,741

[45] Date of Patent: Jun. 29, 1999

[54] FAUCET CARTRIDGE PULLER ASSEMBLY AND METHOD OF USE

[76] Inventor: Robert C. Parker, 315 Center St., Salina, Kans. 67401

[21] Appl. No.: 08/939,645

[22] Filed: Sep. 29, 1997

[51] Int. Cl.[6] .......... B23P 19/04

[52] U.S. Cl. .......... 29/213.1; 29/214; 29/217; 29/240; 29/264; 29/270; 29/221.6; 29/890.141

[58] Field of Search .......... 29/217, 221.6, 29/240, 264, 213.1, 270, 890.141, 214

[56] References Cited

U.S. PATENT DOCUMENTS

| | | | |
|---|---|---|---|
| 4,724,608 | 2/1988 | Parrott | 29/264 |
| 5,054,179 | 10/1991 | Rini | 29/240 |
| 5,075,948 | 12/1991 | Maier | 29/264 |
| 5,119,556 | 6/1992 | Hseu | 29/213.1 |
| 5,669,404 | 9/1997 | Guillermo | 29/221.6 |

*Primary Examiner*—David A. Scherbel
*Assistant Examiner*—Daniel G. Shanley
*Attorney, Agent, or Firm*—Phillip A. Rein

[57] ABSTRACT

A faucet cartridge puller assembly operable to remove a broken defective primary valve cartridge assembly from a faucet valve assembly which is utilized on a kitchen faucet valve assembly, a bath/shower faucet valve assembly, or a bathroom sink faucet valve assembly, all being used in substantially identical manner. The faucet cartridge puller assembly includes 1) a cartridge removal tool assembly adapted to be mountable within a cartridge barrel opening of a damaged primary valve cartridge assembly; and 2) a cartridge removal bolt member mountable within the cartridge removal tool assembly to achieve final axial movement of a damaged primary valve cartridge assembly being removed for replacement. The cartridge removal tool assembly includes a main removal tool body having an intermediate body section with external tap threads operable to be rotated and create threads with the damaged primary valve cartridge assembly so as to pull same longitudinally from a main valve housing. The cartridge removal bolt member is operable to be mounted within a central opening in the cartridge removal tool assembly after it has been attached by mating threads with the primary valve cartridge assembly. The cartridge removal bolt member is rotatable within compatible threads in a lower outer body end section of the cartridge removal tool assembly. An outer abutment end of the cartridge removal bolt member is engageable with a bottom wall of the main valve housing of the faucet valve assembly to cause conjoint axial movement of the interconnected damaged primary valve cartridge assembly and the cartridge removal tool assembly. This causes a loosening of the binding conditions between the primary valve cartridge assembly and the main valve housing so that it can be removed for replacement with a new primary valve cartridge assembly.

14 Claims, 3 Drawing Sheets

Fig. 1
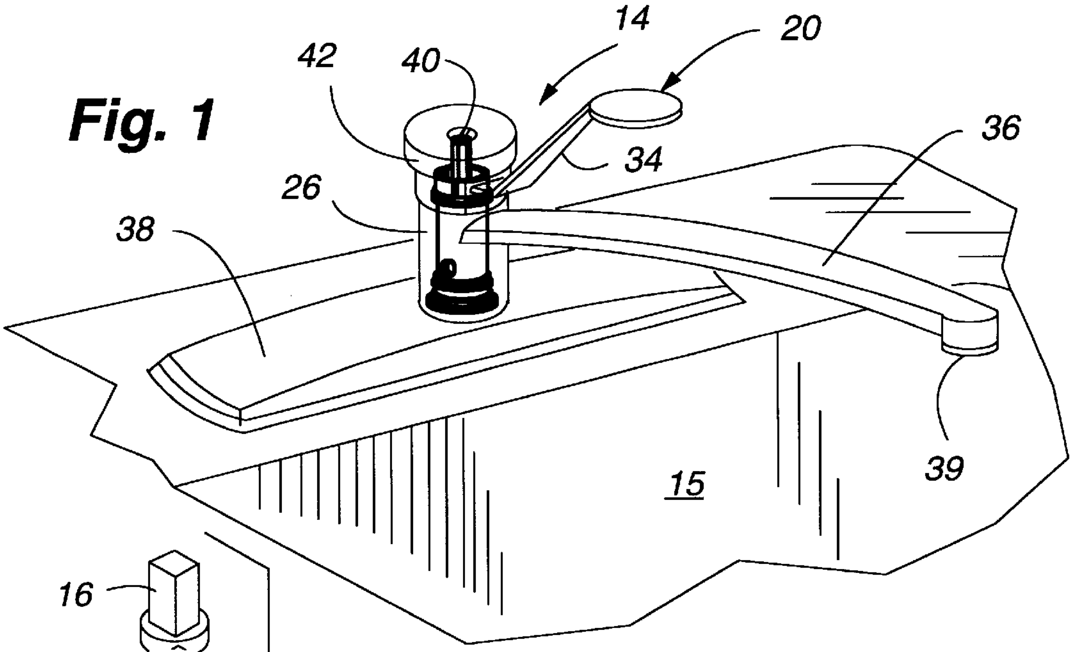
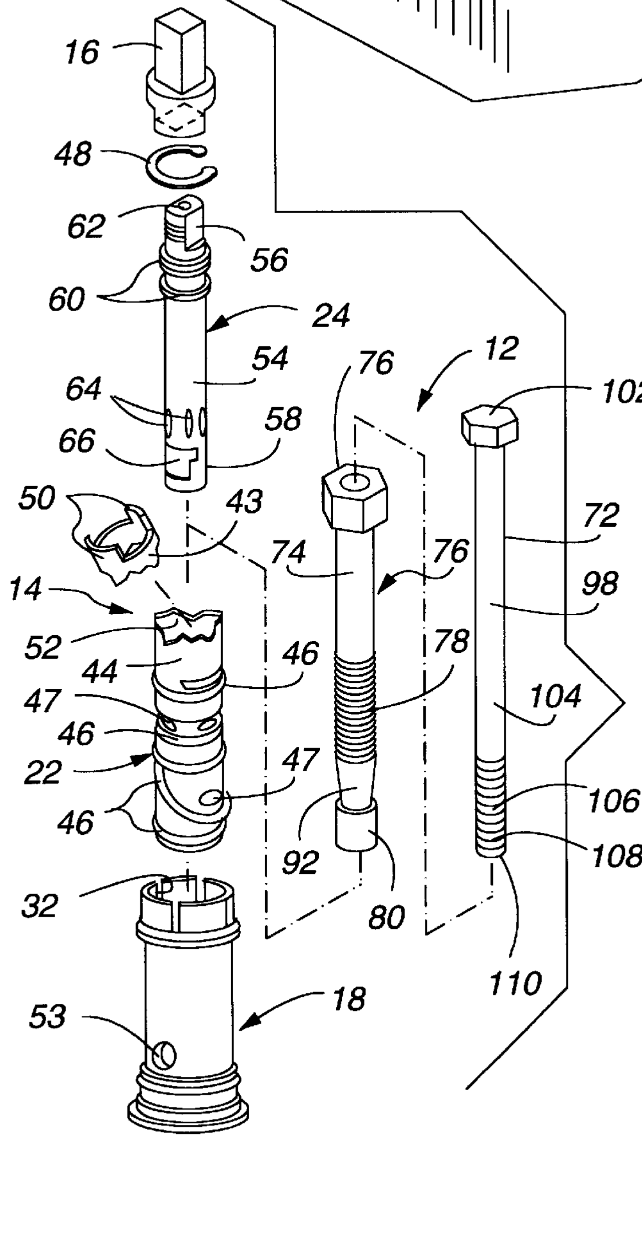
Fig. 2

FAUCET CARTRIDGE PULLER ASSEMBLY AND METHOD OF USE

PRIOR ART

A patent search was not conducted on this invention.

PREFERRED EMBODIMENT OF THE INVENTION

In one preferred embodiment of this invention, a faucet cartridge puller assembly is used with a faucet valve assembly to remove a defective primary valve cartridge assembly from a main valve housing for repair and/or replacement. The faucet valve assembly may be of numerous types utilized on a kitchen sink, a bathroom sink, or a bathtub and shower combination faucet valve assembly.

The faucet valve assembly is normally constructed of brass or plastic material and includes 1) the main valve housing; 2) a faucet handle assembly connected to the main valve housing operable to selectively dispense fluid therefrom; 3) a primary valve cartridge assembly mounted within the main valve housing; and 4) a valve stem assembly rotatably mounted within the primary valve cartridge assembly and movable through the faucet handle assembly to control the flow of water therethrough in a normal faucet valve assembly operation.

The main valve housing is provided with a cartridge housing member having a cartridge receiver opening therein to receive the primary valve cartridge assembly therein.

The primary valve cartridge assembly is provided with a central barrel opening to receive the valve stem assembly therein.

The valve stem assembly is operably connected to the faucet handle assembly and selectively rotatable between closed and fully opened positions to control the amount of hot and cold water and combinations of fluid flow therethrough in a conventional manner.

A problem arises with the faucet valve assembly when leakage occurs requiring replacement of sealing O-rings or the like within the primary valve cartridge assembly. Normally, a cartridge removal tool is applied to the primary valve cartridge assembly after removal of the faucet handle assembly and the valve stem assembly and operable to rotate a main cartridge body and remove for replacement and/or other maintenance operations.

The cartridge removal tool is operable to be placed about a portion of cartridge ears or tongs and rotate the main cartridge body to break the sealing O-rings binding attachment to inner portions of the main valve housing. However, as happens in many cases, the cartridge ears or tongs, which are made of brass or plastic, will break and, therefore, render the primary valve cartridge assembly inoperable and not removable from the main valve housing.

When this malfunction occurs, this normally requires the entire faucet valve assembly, which is expensive, to be removed and replaced which is a labor intensive operation.

The faucet cartridge puller assembly of this invention is operable to be inserted within the damaged primary valve cartridge assembly after removal of the valve stem assembly in order to facilitate removal of subject damaged primary valve cartridge assembly without requiring replacement of the entire faucet valve assembly.

The faucet cartridge puller assembly includes 1) a cartridge removal tool assembly operable to be threadably inserted within the damaged primary valve cartridge assembly; and 2) a cartridge removal bolt member operable to be threadably engageable within the cartridge removal tool assembly to finally remove conjointly the damaged primary valve cartridge assembly and attached cartridge removal tool assembly.

The cartridge removal tool assembly includes a main removal tool body having 1) a top body section; 2) an intermediate body section integral with one end of the top body section; and 3) an outer end body section integral with another outer end of the intermediate body section.

The top body section is provided with an outer tool nut portion of hexagonal shape, a central body opening extended axially therein, and an outer end formed with a groove separator.

The groove separator leads to the intermediate body section having a plurality of external tap threads thereon and a continuation of the central bolt opening.

The outer end body section is connected by an outer tapered portion to an outer end of the intermediate body section and provided with a continuation of the central bolt opening having internal bolt threads therein. The outer end body section includes an outer surface formed with an abutment end wall.

The tool nut portion is operable to receive a crescent wrench or other tool thereon for rotation thereof whereupon the external tap threads are engageable to form threads and, thus, connection to an internal central barrel opening of the primary valve cartridge assembly.

The cartridge removal bolt member includes a main bolt body having 1) a bolt head section of hexagonal shape to receive a crescent wrench or similar tool thereon; 2) an intermediate bolt section having one end integral with the bolt head section; and 3) an outer threaded end section integral with an outer end of the intermediate bolt section. The outer threaded end section is provided with external threads thereon and an outer abutment end.

The external threads are of a similar thread configuration so as to be threadably received within the internal bolt threads on the outer end body section of the cartridge removal tool assembly in a manner to be explained.

In a method of operation or use of the faucet cartridge puller assembly, the cartridge removal tool assembly is inserted within a damaged primary valve cartridge assembly having a valve stem assembly and faucet handle assembly removed therefrom.

The external tap threads on the main removal tool body are operable to be pressed and rotated within the central barrel opening of the main cartridge body of the primary valve cartridge assembly. On rotation of the cartridge removal tool assembly, this operates to cut new internal female threads on the brass or plastic main cartridge body of the damaged primary valve cartridge assembly.

Next, continued rotation of the cartridge removal tool assembly allows the outer abutment end wall therein to contact a bottom wall within the main valve housing of the faucet valve assembly. Further rotation operates to move the damaged primary valve cartridge assembly axially approximately ¼" upwardly from the bottom wall which results in loosening of the sealing O-rings binding contact with adjacent walls of the main valve housing.

At this time, the cartridge removal bolt member is threaded within the internal bolt threads of the outer end body section of the cartridge removal tool assembly. An outer abutment end of the cartridge removal bolt member is pressed against the bottom wall of the main valve housing to further move the cartridge removal tool assembly and interconnected damaged primary valve cartridge assembly axially and upwardly in the main valve housing. Further rotation of the cartridge removal bolt member will achieve final removal of the combination of the damaged primary valve cartridge assembly and the faucet cartridge puller assembly from the main valve housing.

At this time, it is obvious that a new one of a primary valve cartridge assembly will be covered with a silicone grease material and inserted within the main valve housing.

Next, the valve stem assembly is inserted within the new primary valve cartridge assembly and held therein by a retainer clip member. The faucet handle assembly is connected to the valve stem assembly in a conventional manner to complete the maintenance and repair operation by removal and replacement of the damaged primary valve cartridge assembly.

OBJECTS OF THE INVENTION

One object of this invention is to provide a faucet cartridge puller assembly which is used to remove and replace a damaged primary valve cartridge assembly in a faucet valve assembly which is usually broken in an attempt to remove the same from a main valve housing which then normally requires a costly and labor intensive removal and replacement of the entire faucet valve assembly.

Another object of this invention is to 1) provide a faucet cartridge puller assembly having a cartridge removal tool assembly which is mounted within a damaged primary valve cartridge assembly and rotated to interconnect to same; and 2) provide a cartridge removal bolt member mountable within the inserted cartridge removal tool assembly and rotatable to contact a bottom wall of a main valve housing assembly to conjointly axially move the damaged primary valve cartridge assembly and the cartridge removal tool assembly to release from the main valve assembly so that the damaged primary valve cartridge assembly can be replaced with a new one thereof.

One other object of this invention is to provide a faucet cartridge puller assembly having 1) a cartridge removal tool assembly to be threadably mounted within a damaged primary valve cartridge assembly; and 2) a cartridge removal bolt member engageable with the cartridge removal tool assembly to remove this element plus the damaged primary valve cartridge assembly from a main valve housing.

A further object of this invention is to provide a faucet cartridge puller assembly having a cartridge removal tool assembly which can be constructed of various diameters and having external tap threads therein to make threads within a central barrel opening of a primary valve cartridge assembly so as to provide a means of grasping thereof and subsequent removal from a main valve housing.

One further object of this invention is to provide a faucet cartridge puller assembly and a method of removing a damaged primary valve cartridge assembly from a main valve housing in a faucet valve assembly 1) utilizing a cartridge removal tool assembly to be tapped into and engaged with the damaged primary valve cartridge assembly; and 2) using a cartridge removal bolt member in conjunction with the cartridge removal tool assembly to achieve axial movement thereof in conjunction with a threadably connected damaged primary valve cartridge assembly.

Still, one other object of this invention is to provide a faucet cartridge puller assembly having two elements being 1) a cartridge removal tool assembly; and 2) a cartridge removal bolt member operable to be engageable with the cartridge removal tool assembly, both of which are simple to use; economical to manufacture; sturdy in construction; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a fragmentary perspective view of a main sink basin having a single handle faucet valve assembly mounted thereon;

FIG. 2 is an exploded perspective view illustrating 1) a faucet valve assembly; 2) a defective primary valve cartridge assembly; and 3) a cartridge removal tool; and 4) a faucet cartridge puller assembly of this invention;

Figure 3:
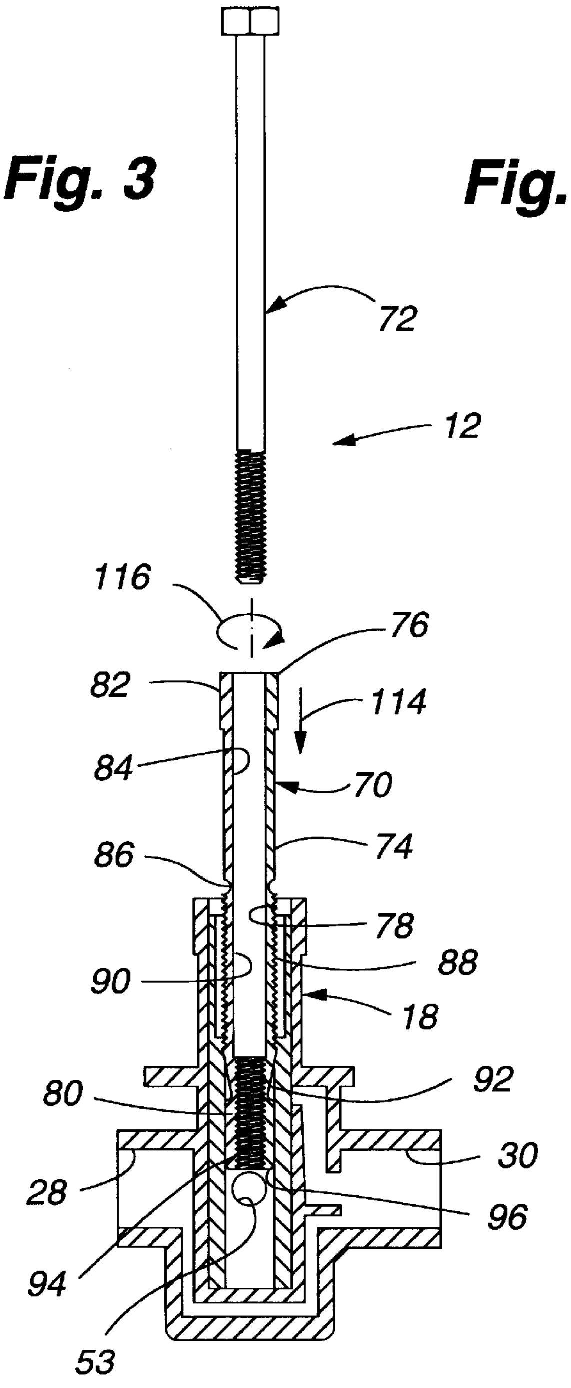
FIG. 3 is a sectional view of a defective primary valve cartridge assembly in a main valve housing having a cartridge removal tool assembly of the faucet cartridge puller assembly mounted therein.

The following is a discussion and description of preferred specific embodiments of the faucet cartridge puller assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings in detail, and in particular to FIG. 1, a faucet cartridge puller assembly of this invention, indicated generally at 12, is to be used on a faucet valve assembly 14 illustrated as attached to a main sink basin 15. The faucet valve assembly 14 is operable to selectively dispense hot, cold, or intermediate temperature water therefrom in a conventional manner.

A problem arises when a portion of the faucet valve assembly 14 becomes defective and must be disassembled for repair and maintenance which can be a difficult task due to corrosion and deterioration of O-rings therein.

The faucet valve assembly 14 includes 1) a cover and mounting base 38 secured to an upper surface of the main sink basin 15; 2) a main valve housing 18 connected to the cover and mounting base 38; 3) a faucet handle assembly 20 mounted about the main valve housing 18 and pivotally connected to the cover and mounting base 38; 4) a primary valve cartridge assembly 22 mounted within a portion of the main valve housing 18; and 5) a valve stem assembly 24 rotatably mounted within the primary valve cartridge assembly 22 and rotatable through interconnection to the faucet handle assembly 20 as will be explained.

As shown in FIG. 3, the main valve housing 18 includes a cartridge housing member 26 with an inlet opening 28, a discharge opening 30, a bottom wall 31, and a fluid opening 53.

The cartridge housing member 26 is provided with a central vertically extended cartridge receiver opening 32 to receive and support the primary valve cartridge assembly 22 therein as will be explained.

The faucet handle assembly 20 includes a single handle member 34 integral with a fluid discharge spout 36 having an outer discharge opening 39 therein (FIG. 1). The single handle member 34 is secured by a retainer screw 40 to the valve stem assembly 24 and having a handle cover 42 operable to enclose and cover the retainer screw 40.

As noted in FIG. 2, the primary valve cartridge assembly 22 may have a broken damaged section 43 thereon which is the primary reason for the faucet cartridge puller assembly 12 of this invention as will be explained.

As shown in FIG. 2, the primary valve cartridge assembly 22 includes 1) a main cartridge body 44; 2) a plurality of spaced sealed O-rings 46 thereon to allow for proper flow of hot, cold, and combinations of water temperature therethrough; 3) a plurality of fluid flow openings 47 therein to achieve a fluid discharge therethrough; and 4) a retainer clip member 48 engageable with an inner upper portion of the main cartridge body 44 to hold the valve stem assembly 24 within the primary valve cartridge assembly 22 in the assembled condition.

The main cartridge body 44 is provided with 1) opposed upper cartridge ears or tongs 50 (shown on the broken damaged section 43); and 2) a central barrel opening 52 therein to receive fluid from the inlet opening 28 for subsequent exit through the discharge opening 30.

The retainer clip member 48 is of a conventional nature mounted within a clip receiving groove on an interior surface on an upper portion of the main cartridge body 44 to hold the valve stem assembly 24 therein.

As noted in FIG. 2, the valve stem assembly 24 includes a valve body member 54 having an outer handle connector end 56 and an opposite outer fluid channel end 58. The valve body member 54 is provided with grooves having spaced valve O-ring members 60 therein for sealing within the main cartridge body 44 of the primary valve cartridge assembly 22.

The handle connector end 56 is provided with an outer internally threaded opening 62 to receive the retainer screw 40 to secure the single handle member 34 of the faucet handle assembly 20 thereto.

The fluid channel end 58 is provided with a plurality of fluid inlet openings 64 and a fluid discharge channel 66 operable on rotation and pivotal movement of the single handle member 34 to control on and off positions, amount or volume of fluid flow therein, and mixture of hot and cold water supply to achieve the desired temperature of outlet fluid flow through the discharge opening 39 in a conventional manner.

As noted in FIG. 2, the faucet cartridge puller assembly 12 comprises two elements, namely, 1) a cartridge removal tool assembly 70 engageable with a damaged primary valve cartridge assembly 22 as will be explained; and 2) a cartridge removal bolt member 72 mountable within the cartridge removal tool assembly 70 and engageable with the bottom wall 31 of the main valve housing 18.

The cartridge removal tool assembly 70 includes a main removal tool body 74 with 1) a top body section 76; 2) an intermediate body section 78 integral with an outer end of the top body section 76; and 3) an outer end body section 80 integral with an outer end of the intermediate body section 78.

The top body section 76 is provided with 1) an outer tool nut portion 82; 2) a central bolt opening 84; and 3) an outer groove separator 86. The tool nut portion 82 is of a hexagonal shape so as to receive a crescent wrench or other tool thereon to achieve rotation thereof as will be noted.

The intermediate body section 78 proceeds from its integral connection with the groove separator 86 and having external tap threads 88 thereon and a central bolt opening 90 continuing from the central bolt opening 84.

The external tap threads 88 are of a conventional nature having special tapered threads at a lower end thereof in order to start and create threads in the central barrel opening 52 in the primary valve cartridge assembly 22.

The outer end body section 80 is provided with an outer tapered portion 92 leading from its' integral connection with the lower portion of the external tap threads 88 and having internal bolt threads 94 plus an outer abutment end wall 96.

The cartridge removal bolt member 72 is provided with a main bolt body 98 having an upper bolt head section 102 which is integral with an intermediate bolt section 104 which, in turn, is integral with an outer threaded end section 196.

The bolt head section 102 is of a hexagonal bolt shape operable to receive a crescent wrench or other tool thereon to achieve rotational movement of the entire cartridge removal bolt member 72 during its usage as will be explained.

The outer threaded end section 106 is provided with external threads 108 and an outer abutment end 110 for use in a manner to be described.

USE AND OPERATION OF THE INVENTION

In the use and operation of the faucet cartridge puller assembly 12 of this invention, we will refer to FIG. 1 illustrating the faucet valve assembly 14 mounted on the main sink basin 15. We will assume that there is some problem with the faucet valve assembly 14, such as a leakage therefrom, which would indicate that the O-rings or valve washer members may have to be changed internally to correct this leakage problem.

The repairman would first proceed with the disassembly of the faucet valve assembly 14 whereupon the upper handle cover 42 would be removed and a screwdriver used to remove the retainer screw 40 which allows for the faucet handle assembly 20, including the fluid discharge spout 36, to be removed therefrom. This would then expose the main valve housing 18 having the primary valve cartridge assembly 22 which, in turn, has the valve stem assembly 24 mounted therein which would be exposed.

A second step for the repairman would be to remove the retainer clip member 48 from the primary valve cartridge assembly 22 which then allows the valve stem assembly 24 to be pulled outwardly from within the central barrel opening 52 in the main cartridge body 44 of the primary valve cartridge assembly 22.

The next step would be for the repairman to use the plastic cartridge removal tool 16 to be placed about the handle connector end 56 of the valve stem assembly 54 and having portions on opposite sides engageable with the cartridge ear or tongs 50 on the primary valve cartridge assembly 22.

As may happen with use of the cartridge removal tool 16, twisting thereof may cause a separation of a broken damaged section 43 from the main cartridge body 44 of the primary valve cartridge assembly 22 as noted in FIG. 2. At this time, it is necessary that the repairman either 1) replace the entire faucet valve assembly 14 which can be an expensive and time consuming operation; or 2) utilize the faucet cartridge puller assembly 12 of this invention to remove the damaged primary valve cartridge assembly 22 from the main valve housing 18.

In a first method step of removing the damaged primary valve cartridge assembly 22, the cartridge removal tool assembly 70 is inserted within the central barrel opening 52 of the main cartridge body 44 of the primary valve cartridge assembly 22 as noted in FIG. 3.

Next, a crescent wrench or other similar tool is connected to the tool nut portion 82 of the top body section 76 of the cartridge removal tool assembly 70 and rotated in a clockwise direction as noted by an arrow 116 in FIG. 3. This causes the external tap threads 88 on the intermediate body section 78 to engage and start to form new internal threads with an inner lower portion of the main cartridge body 44 of the primary valve cartridge assembly 22.

Figure 4:
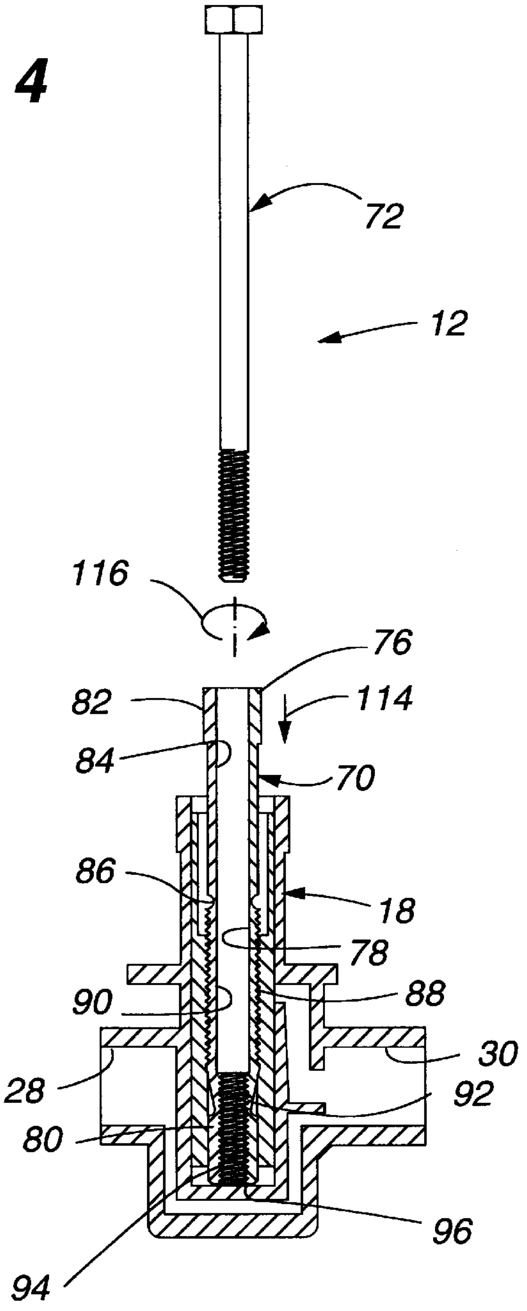
FIGS. 4, 5 and 6 are schematic diagrams similar to FIG. 3 showing various method steps of use of the faucet cartridge puller assembly of this invention.

The rotation of the cartridge removal tool assembly 70 through the crescent wrench or other tool engaging the tool nut portion 82 will move the entire main removal tool body 74 downwardly to the position as noted in FIG. 4 by an arrow 114. At this time, the abutment end wall 96 engages the inner bottom wall 31 of the main cartridge body 44 and is operable, on further rotation, to move the primary valve cartridge assembly 22 upwardly approximately ¼" from the bottom wall 31 as noted in FIG. 4.

Figure 5:
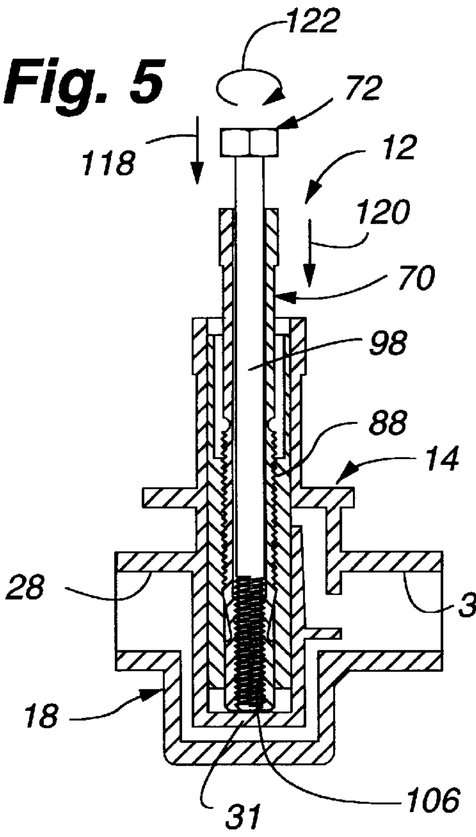

The next method step is to place the cartridge removal tool bolt member 72 within the central bolt openings 84, 90 and into the internal bolt threads 94 of the cartridge removal tool assembly 70 as noted in FIG. 5.

Figure 6:
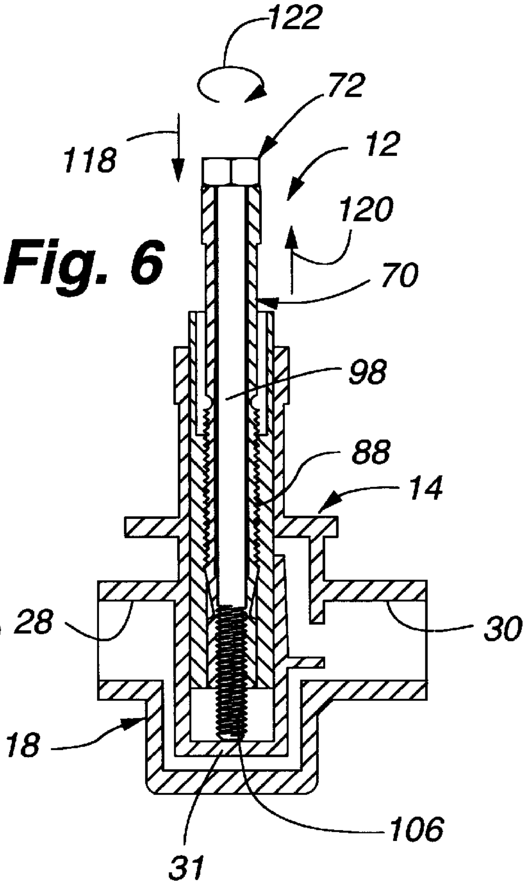
Figure 7:
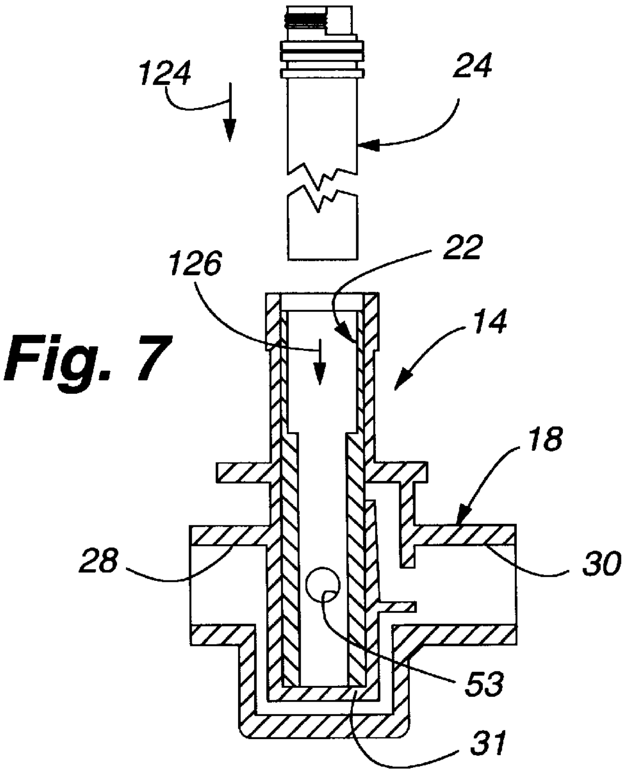
FIG. 7 is a sectional view of a portion of the faucet valve assembly and having a new primary valve cartridge assembly mounted therein in a re-assembly method step of this invention.

The next step is to utilize the crescent wrench or other similar tool to engage the bolt head section 102 of the cartridge removal bolt member 72 and rotate same in a clockwise direction as noted by an arrow 122 in FIGS. 6 and 7.

This operates to move the interconnected damaged primary valve cartridge assembly 22 and the entire cartridge removal tool assembly 70 upwardly as noted by an arrow 120 in FIG. 6.

At this time, this has loosened the adherence of all of the sealing O-ring members 46 on the main cartridge body 44 of the primary valve cartridge assembly 22 to disengage same from adjacent surfaces in the cartridge receiver opening 32 in the main valve housing 18.

Then, the loosened damaged primary valve cartridge assembly 22 can normally be easily removed from the main valve housing 18 for replacement with a new primary valve cartridge assembly 22.

As noted in FIG. 7, a new primary valve cartridge assembly 22 is mounted within the cartridge receiver opening 32 in the main valve housing 18 of the faucet valve assembly 14.

Next, a new or repaired one of the valve stem assembly 24 is inserted within the new primary valve cartridge assembly 22 and the valve stem assembly 24 is locked therein by the retainer clip member 48 engageable with a top washer member on the valve stem assembly 24 and placed within an internal groove of the central barrel opening 52 of the primary valve cartridge assembly 22.

The faucet valve assembly 18 is then re-assembled with the faucet handle assembly 20 to achieve the repaired assembly as noted in FIG. 1.

It is seen that the method steps of this invention utilizing a faucet cartridge puller assembly 12 is operable to remove a damaged one of the primary valve cartridge assembly 22 having the broken damaged section 43 without requiring the time consuming and expense required to replace the entire faucet valve assembly 14.

It is to be noted that the faucet cartridge puller assembly 12 can be manufactured with the cartridge removal tool assembly 70 having variations of outer diameters, including the diameter of the external tap threads 88, so as to be usable to remove a damaged primary valve cartridge assembly 22 of various sizes.

The cartridge removal bolt member 72 can be of various sizes and diameters being compatible with the internal bolt threads 94 formed on the outer end body section 80 of the cartridge removal tool assembly 70.

It is noted that the cartridge removal tool assembly 70 with its external tap threads 88 is operable to readily produce new threads within the central barrel opening 52 of the damaged primary valve cartridge assembly 22 whether constructed of a brass or plastic material.

It is noted that the faucet cartridge puller assembly of this invention can be readily used by one without specific skills to remove a damaged primary valve cartridge assembly from the main valve housing with subject tool assembly being economical to manufacture; easy to use; and substantially maintenance free.

While the invention has been described in conjunction with preferred specific embodiments thereof, it will be understood that this description is intended to illustrate and not to limit the scope of the invention, which is defined by the following claims:

I claim:

1. A faucet cartridge puller assembly used to remove a defective valve cartridge assembly from a faucet valve assembly, comprising:

a) a cartridge removal tool assembly including a main removal tool body having a top body section, an intermediate body section, and an outer end body section;

b) said intermediate body section having external tap threads mountable within a central barrel opening in a defective valve cartridge assembly to create new threads and form a connection to the defective valve cartridge assembly; and c) said outer end body section engageable with a portion of a faucet valve assembly to move the defective valve cartridge assembly axially to unseat and subsequently remove same from the faucet valve assembly.

2. A faucet cartridge puller assembly as described in claim 1, wherein:

a) said top body section having an outer tool portion operable to receive a tool member thereon for ease of rotation of said main removal tool body in the defective valve cartridge assembly during removal thereof.

3. A faucet cartridge puller assembly as described in claim 1, wherein:

a) said main removal tool body having a central opening therethrough adapted to receive a cartridge removal member therein.

4. A faucet cartridge puller assembly as described in claim 3, wherein:

a) said central opening having internal threads operable to receive external threads on the cartridge removal member therein to move the defective valve cartridge assembly axially in the faucet valve assembly.

5. A faucet cartridge puller assembly as described in claim 1, including:

a) a cartridge removal bolt member including a main bolt body having a bolt section with an outer threaded section; and b) said outer threaded section engageable with said outer end body section and operable to contact the faucet valve assembly to unseat and remove the defective valve cartridge assembly.

6. A faucet cartridge puller assembly as described in claim 5, wherein:

a) said outer threaded section having external threads engageable with internal bolt threads on said outer end body section to move said cartridge removal tool assembly and interconnected defective valve cartridge assembly axially.

7. A faucet cartridge puller assembly as described in claim 5, wherein:

a) said cartridge removal bolt member includes an outer bolt head section operable to receive a tool member thereon for ease of rotation of said cartridge removal bolt member.

8. A faucet cartridge puller assembly used to remove a defective valve cartridge assembly from a faucet valve assembly, comprising:

a) a cartridge removal tool assembly having means to connect to a defective valve cartridge assembly mounted in a faucet valve assembly; and b) said cartridge removal tool assembly rotatable within the defective valve cartridge assembly and engageable with a portion of the faucet valve assembly to unseat and axially move the defective valve cartridge assembly for subsequent removal thereof from the faucet valve assembly.

9. A faucet cartridge puller assembly as described in claim 8, including:

a) a cartridge removal bolt member connected to said cartridge removal tool assembly to cause conjoint axial movement of said cartridge removal tool assembly and interconnected defective valve cartridge assembly to concurrently remove from the faucet valve assembly.

10. A faucet cartridge puller assembly as described in claim 8, wherein:

a) said cartridge removal tool assembly engaged by new tap threads created by said means to connect to the defective valve cartridge assembly.

11. A faucet cartridge puller assembly as described in claim 9, wherein:

a) said cartridge removal bolt member threadably connected to said cartridge removal tool assembly to cause axial movement thereof.

12. A faucet cartridge puller assembly as described in claim 8, wherein:

a) said cartridge removal tool assembly includes an intermediate body section having said means to connect thereon; and b) said means to connect are external tap threads.

13. A faucet cartridge puller assembly as described in claim 9, wherein:

a) said cartridge removal tool assembly having an outer end body end section having internal bolt threads operable to receive external threads on said cartridge removal bolt member to achieve axial movement of said cartridge removal tool assembly and the defective valve cartridge assembly.

14. A faucet cartridge puller assembly as described in claim 12, wherein:

a) said external tap threads mounted in a central barrel opening in the defective valve cartridge assembly to create new threads therein to achieve said means to connect.

* * * * *